United States Patent
Appu et al.

(10) Patent No.: US 10,262,393 B2
(45) Date of Patent: Apr. 16, 2019

(54) MULTI-SAMPLE ANTI-ALIASING (MSAA) MEMORY BANDWIDTH REDUCTION FOR SPARSE SAMPLE PER PIXEL UTILIZATION

(71) Applicant: Intel Corporation, Santa Clara, CA (US)

(72) Inventors: Abhishek R. Appu, El Dorado Hills, CA (US); Prasoonkumar Surti, Folsom, CA (US); Subhajit Dasgupta, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 15/394,084

(22) Filed: Dec. 29, 2016

(65) Prior Publication Data

US 2018/0189926 A1 Jul. 5, 2018

(51) Int. Cl.
*G06T 1/60* (2006.01)
*G06T 1/20* (2006.01)

(52) U.S. Cl.
CPC .............. *G06T 1/60* (2013.01); *G06T 1/20* (2013.01); *G06T 2200/28* (2013.01)

(58) Field of Classification Search
CPC ....................................................... G06T 1/60
USPC ............................................................ 345/522
See application file for complete search history.

(56) References Cited

U.S. PATENT DOCUMENTS

| | | | | |
|---|---|---|---|---|
| 5,684,939 A * | 11/1997 | Foran | ..................... | G06T 11/001 345/612 |
| 5,977,987 A * | 11/1999 | Duluk, Jr. | ............... | G06T 15/10 345/441 |
| 6,658,159 B1 * | 12/2003 | Taubman | ............. | H04N 19/647 375/240.19 |
| 6,885,378 B1 * | 4/2005 | Tsai | ....................... | G06T 15/005 345/541 |
| 7,064,771 B1 * | 6/2006 | Jouppi | ................... | G09G 5/363 345/506 |
| 7,333,119 B1 * | 2/2008 | King | ........................ | G06T 11/40 345/428 |
| 7,876,332 B1 * | 1/2011 | Donham | ............... | G06T 15/005 345/421 |
| 8,044,956 B1 * | 10/2011 | Kilgard | ................. | G06T 15/503 345/426 |
| 8,547,395 B1 * | 10/2013 | Hutchins | ................. | G06T 11/40 345/611 |
| 9,830,740 B2 * | 11/2017 | Cho | ....................... | G06T 15/503 |
| 2003/0160980 A1 * | 8/2003 | Olsson | ....................... | G03F 1/76 358/1.9 |
| 2006/0202990 A1 * | 9/2006 | Barenbrug | ............ | G06T 15/005 345/426 |
| 2009/0027416 A1 * | 1/2009 | Barone | ................. | G06T 11/001 345/611 |

(Continued)

*Primary Examiner* — Javid A Amini
(74) *Attorney, Agent, or Firm* — Spectrum IP Law Group LLC

(57) ABSTRACT

Methods and apparatus relating to Multi-Sample Anti-Aliasing (MSAA) memory bandwidth reduction for sparse sample per pixel utilization are described. In an embodiment, Multi-Sample Anti-Aliasing (MSAA) logic generates render subspan plane information based on data stored in a cacheline. One or more read operations to memory are suppressed based on a determination that the cacheline is in a clear state. Other embodiments are also disclosed and claimed.

25 Claims, 16 Drawing Sheets

(56) References Cited

U.S. PATENT DOCUMENTS

| | | | | |
|---|---|---|---|---|
| 2009/0091577 A1* | 4/2009 | Brothers | G06T 1/20 | 345/506 |
| 2009/0256848 A1* | 10/2009 | Iourcha | G06T 5/002 | 345/522 |
| 2011/0249901 A1* | 10/2011 | Zhong | G06T 5/002 | 382/199 |
| 2012/0013629 A1* | 1/2012 | Fowler | G06T 9/00 | 345/531 |
| 2014/0240328 A1* | 8/2014 | Surti | G06F 1/3206 | 345/506 |
| 2014/0294078 A1* | 10/2014 | Seregin | H04N 19/176 | 375/240.15 |
| 2014/0328127 A1* | 11/2014 | Tai | G06F 12/06 | 365/185.12 |
| 2015/0221063 A1* | 8/2015 | Kim | G06T 1/60 | 345/557 |
| 2015/0264223 A1* | 9/2015 | Akenine-Moller | H04N 19/60 | 382/166 |
| 2015/0317827 A1* | 11/2015 | Crassin | G06T 1/60 | 345/426 |
| 2016/0110914 A1* | 4/2016 | Cho | G06T 15/503 | 345/426 |
| 2016/0124873 A1* | 5/2016 | Xu | G06F 13/4243 | 711/105 |
| 2016/0180585 A1* | 6/2016 | Maiyuran | G06T 15/005 | 345/420 |
| 2016/0188668 A1* | 6/2016 | Sharangpani | G06F 17/30153 | 707/718 |
| 2016/0352748 A1* | 12/2016 | Hwang | H04L 63/102 | |
| 2017/0206011 A1* | 7/2017 | Chambliss | G06F 3/061 | |
| 2017/0329703 A1* | 11/2017 | Lo | G06F 12/0246 | |
| 2017/0358055 A1* | 12/2017 | Swift | G06T 1/20 | |
| 2018/0091433 A1* | 3/2018 | Barsness | H04L 47/27 | |

* cited by examiner

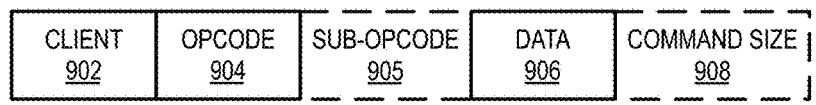
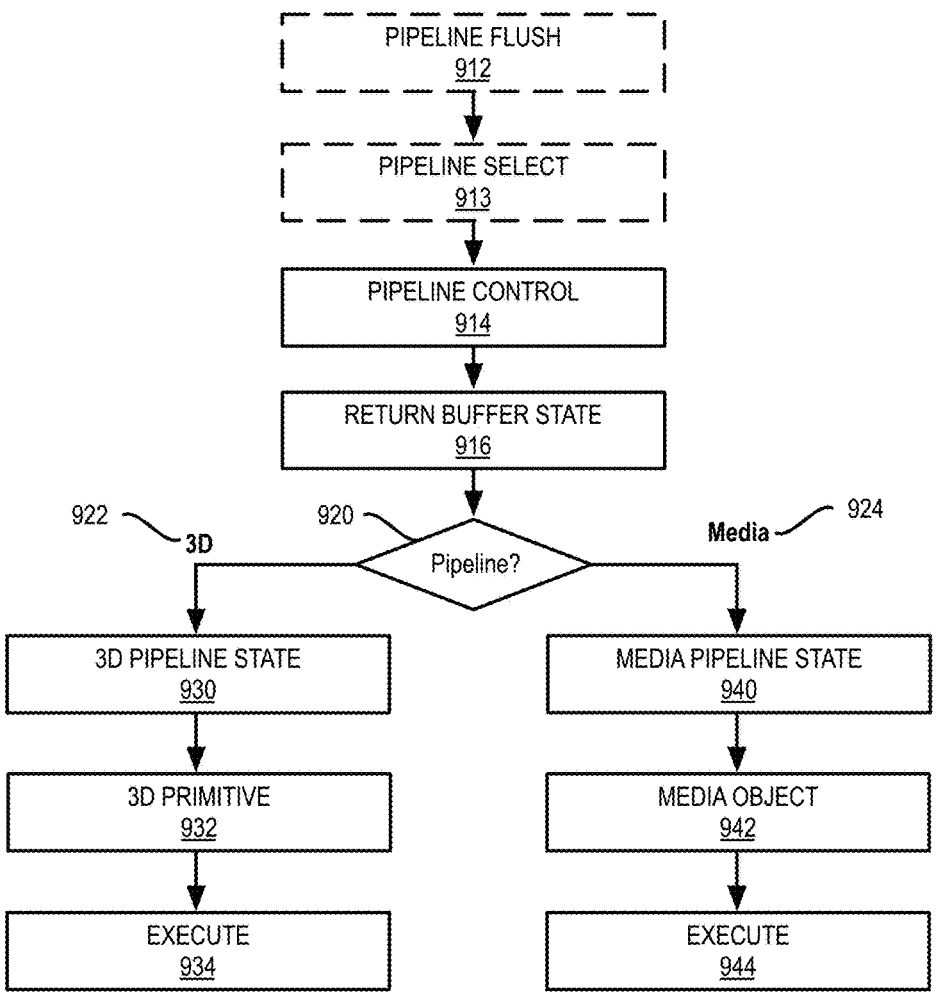

MULTI-SAMPLE ANTI-ALIASING (MSAA) MEMORY BANDWIDTH REDUCTION FOR SPARSE SAMPLE PER PIXEL UTILIZATION

FIELD

The present disclosure generally relates to the field of electronics. More particularly, some embodiments relate to Multi-Sample Anti-Aliasing (MSAA) memory bandwidth reduction for sparse sample per pixel utilization.

BACKGROUND

In computer graphics, rendering generally refers to the process of generating an image from a two-dimensional (2D) or three-dimensional (3D) model. This process can be very compute intensive and may utilize a relatively large amount of memory bandwidth in a computing system. Hence, even a small reduction in memory bandwidth utilization for rendering operations may result in a significant improvement in overall system performance and/or power consumption efficiency.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 9A and 9B illustrate graphics processor command format and sequence, respectively, according to some embodiments.

DETAILED DESCRIPTION

Figure 1:
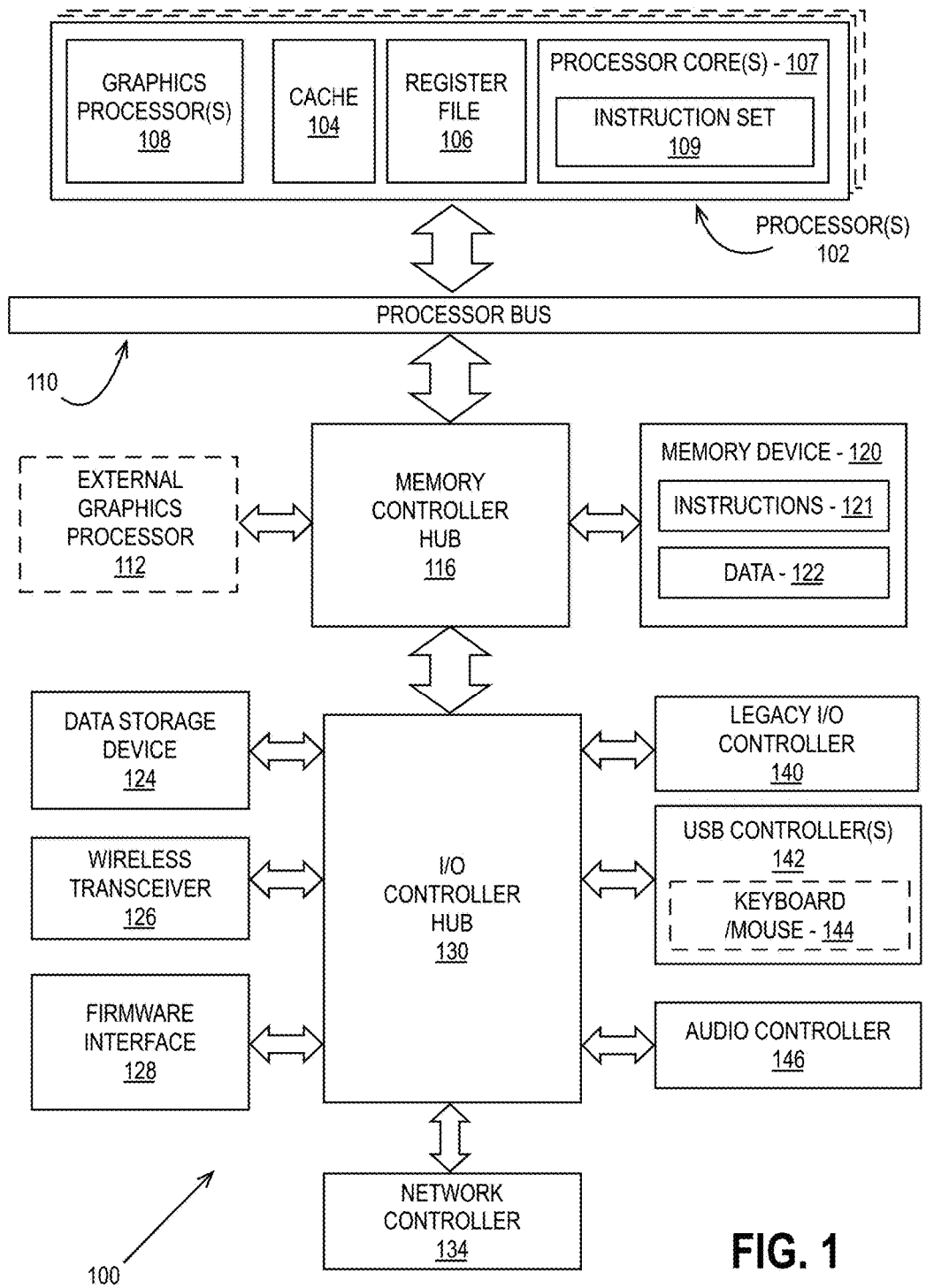
FIGS. 1 and 10 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, memory bandwidth usage associated with rendering operations may have a large impact on overall system performance and/or power consumption efficiency. More particularly, one big challenge in rendering to Multi Sampled Render Targets or MSRT (especially four-fold and higher) at peak performance is memory bandwidth efficiency. In non MSAA (Multi-Sample Anti-Aliasing) mode, the control surface contains clear encoding per render cacheline (e.g., by utilizing a bit), which indicates if the cacheline is in clear state. The render cache uses this indication (or bit) to suppress read request when a read/write allocation misses the render cache. In MSAA (e.g., over one-fold) mode, the clear encoding is per subspan (where "subspan" generally refers to the smallest pixel block on which the hardware operates, such as a 2×2 pixel block) instead of per cacheline which if used directly will only allow for deferring of read operations to a later point, resulting in partials (when all bytes in a cacheline are not enabled or not all data has been written to the cacheline) at the time of cache eviction. And, even if lossless compression is supported for MSAA surfaces, these partials will have to be merged in the victim cache, which in turn results in a read operation of the entire cacheline from memory. As discussed herein, victim cache (or VC) generally refers to a special cache (e.g., companion to L1 cache) which may be used for performing various operations discussed herein, for example, including merging of partials, etc.

To this end, some embodiments provide techniques for Multi-Sample Anti-Aliasing (MSAA) memory bandwidth reduction for sparse sample per pixel utilization. More particularly, one embodiment eliminates the extra read operation (of the entire cacheline from memory mentioned above) by using the current sample to plane mapping encoding in the control/auxiliary surface to internally generate the per-render-cacheline no-sample allocation information, which can then be used to fill up don't care data and enable all of the Byte enables. This cacheline will eliminate the need for merging partials prior to lossless compression, e.g., increasing compressibility which is another improvement provided by at least some embodiments. Furthermore, such approaches can help improve compression ratio on MSRT surfaces.

Further, some embodiments may be applied in computing systems that include one or more processors (e.g., with one or more processor cores), such as those discussed with reference to FIGS. 1-16, including for example mobile computing devices, e.g., a smartphone, tablet, UMPC (Ultra-Mobile Personal Computer), laptop computer, Ultrabook™ computing device, wearable devices (such as a smart watch or smart glasses), etc.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
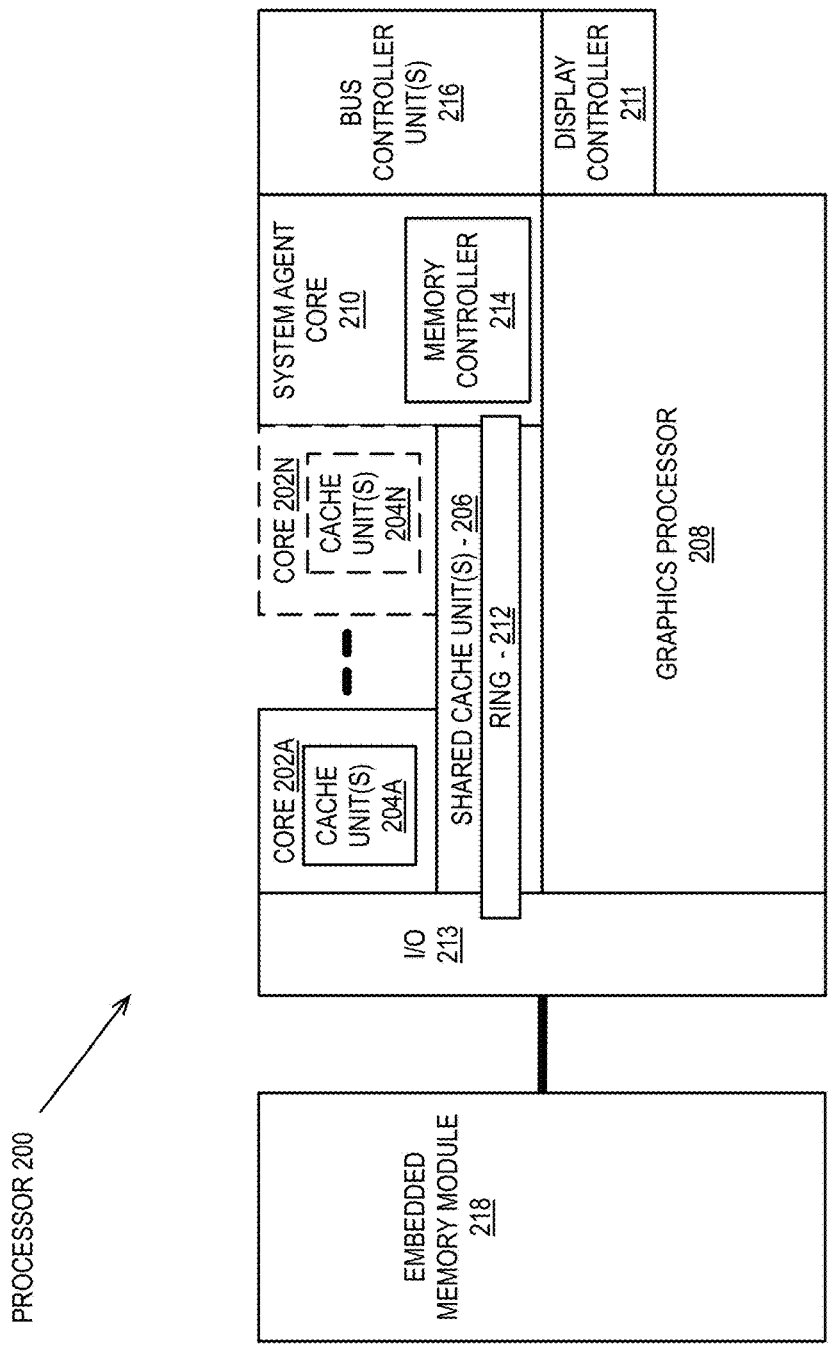
FIGS. 2, 3, 4, 5, 6, 8, 13, and 14 illustrate various components of processors in accordance with some embodiments.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
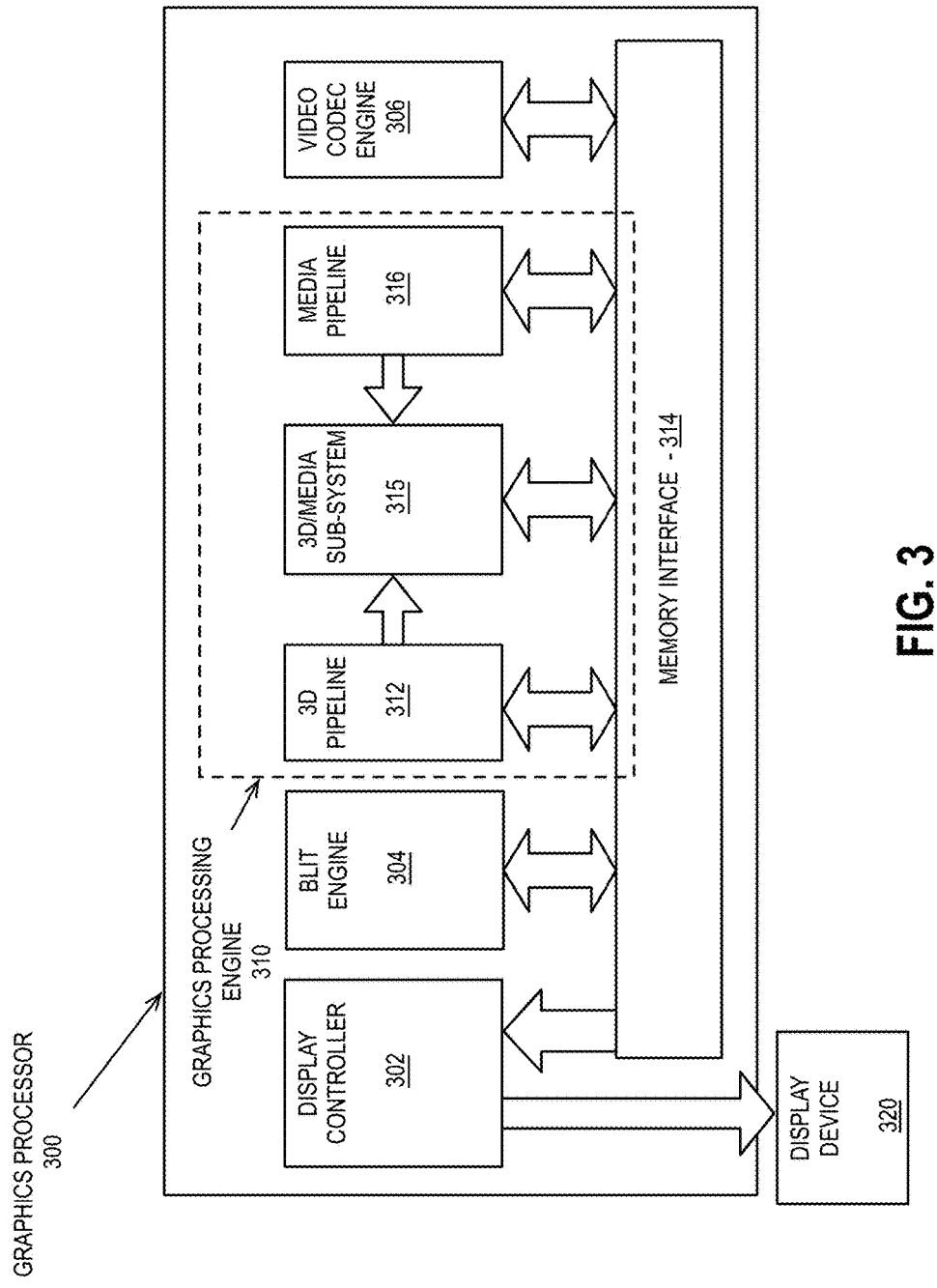

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
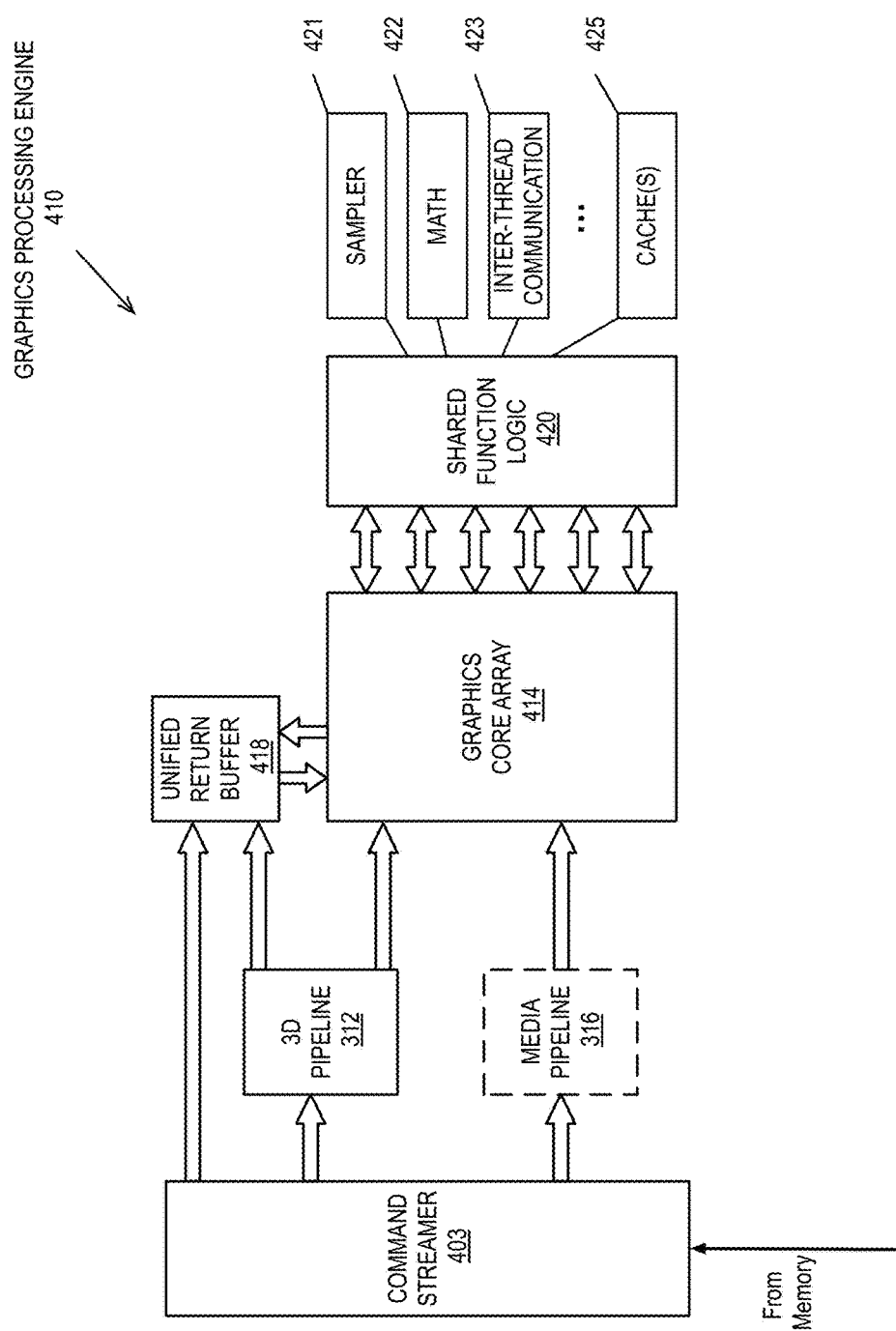

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example, and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
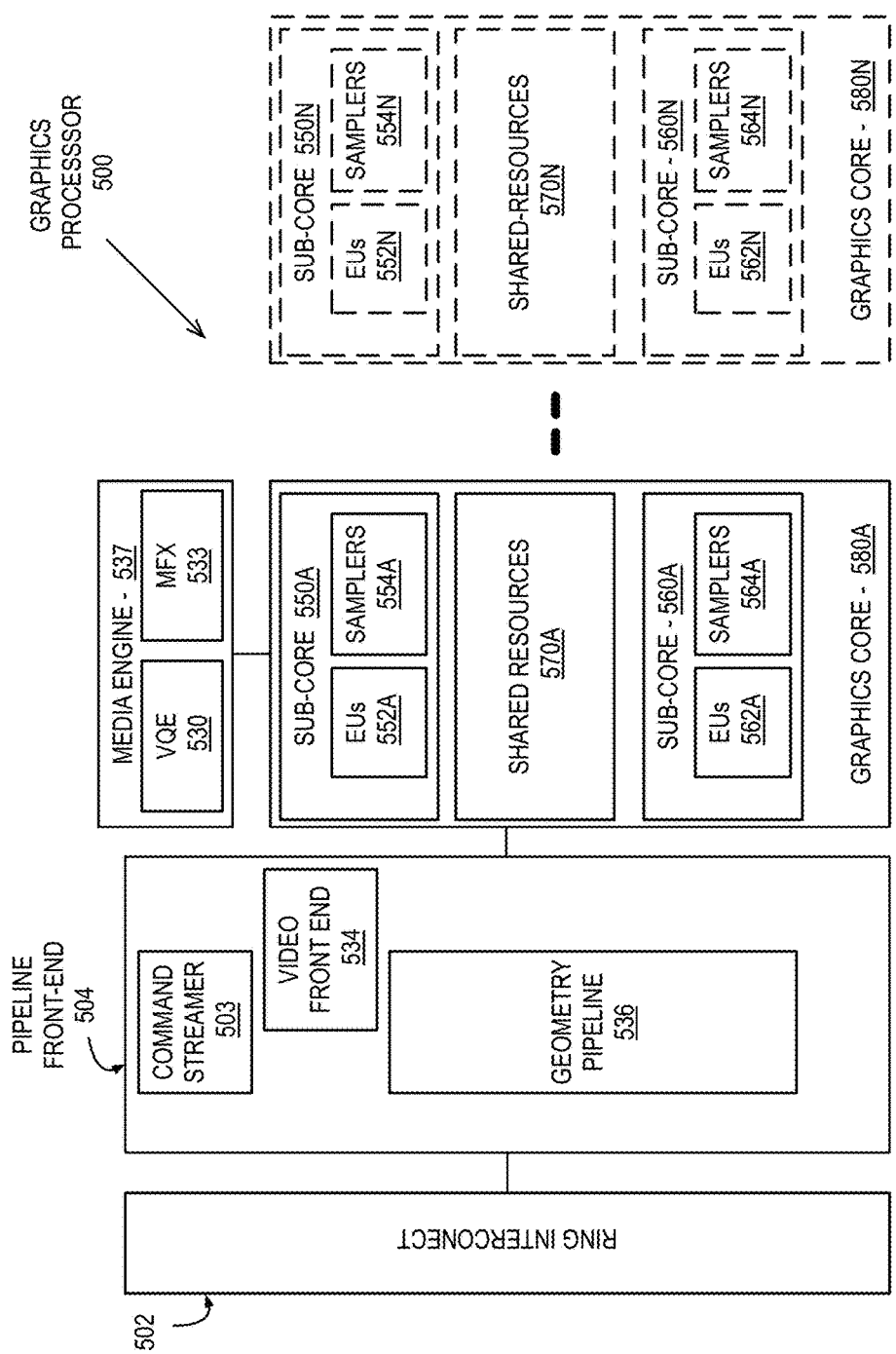

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
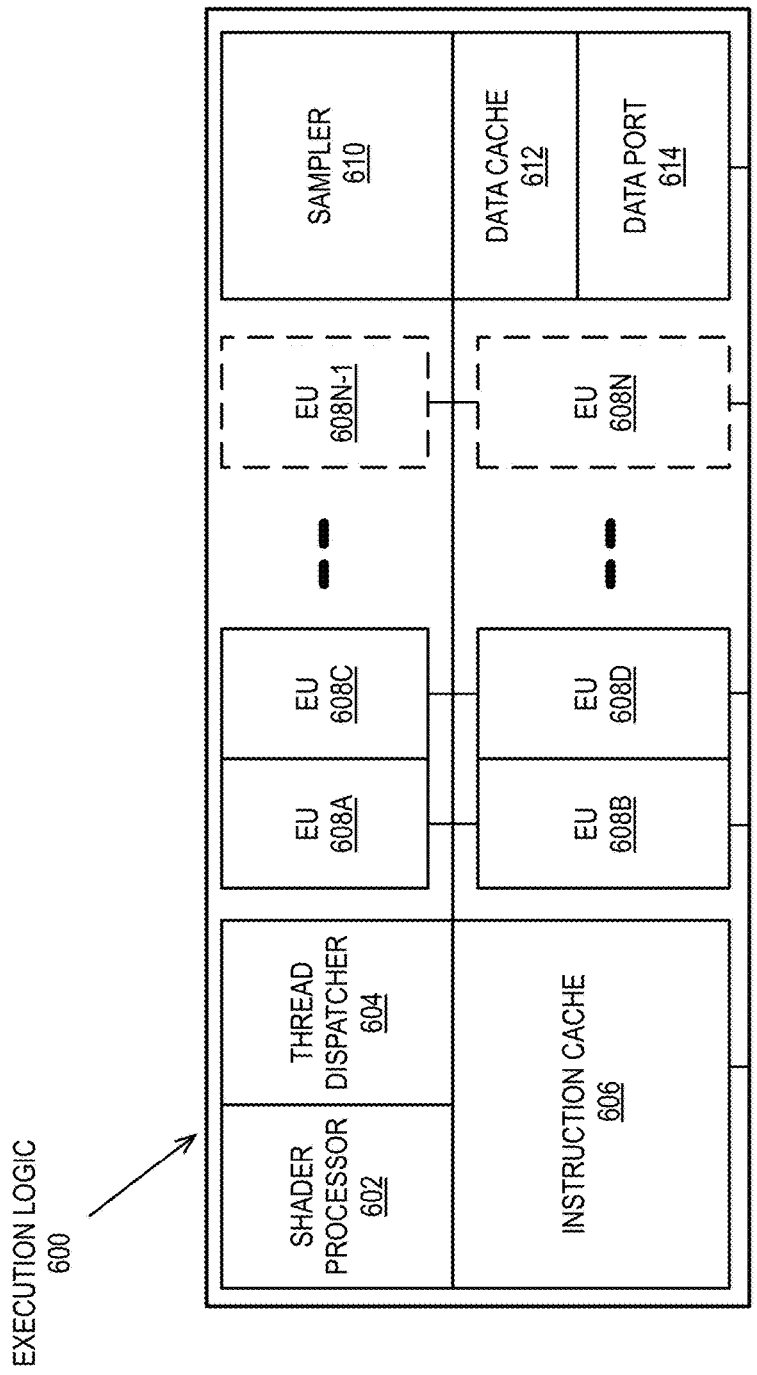

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
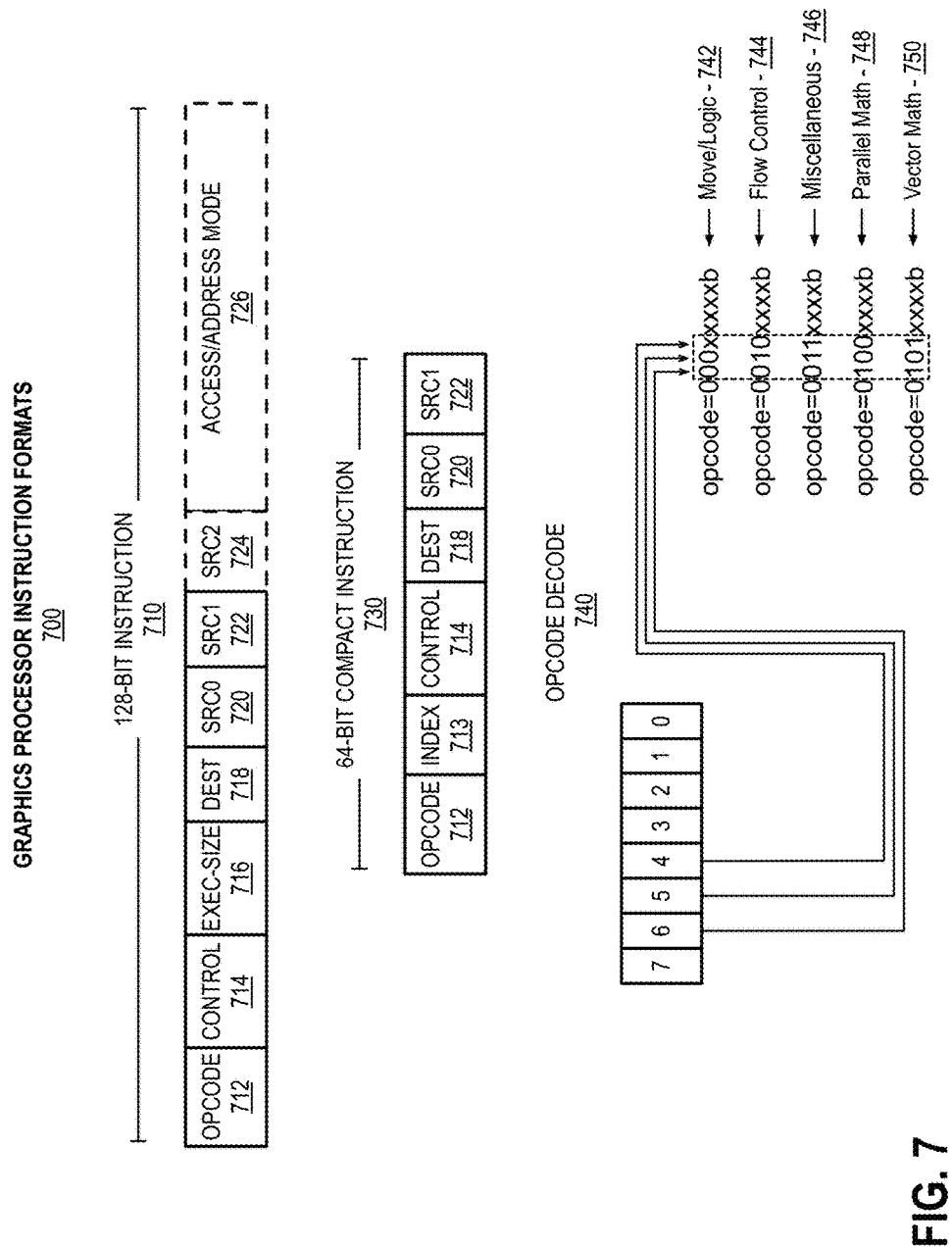
FIG. 7 illustrates graphics core instruction formats, according to some embodiments.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
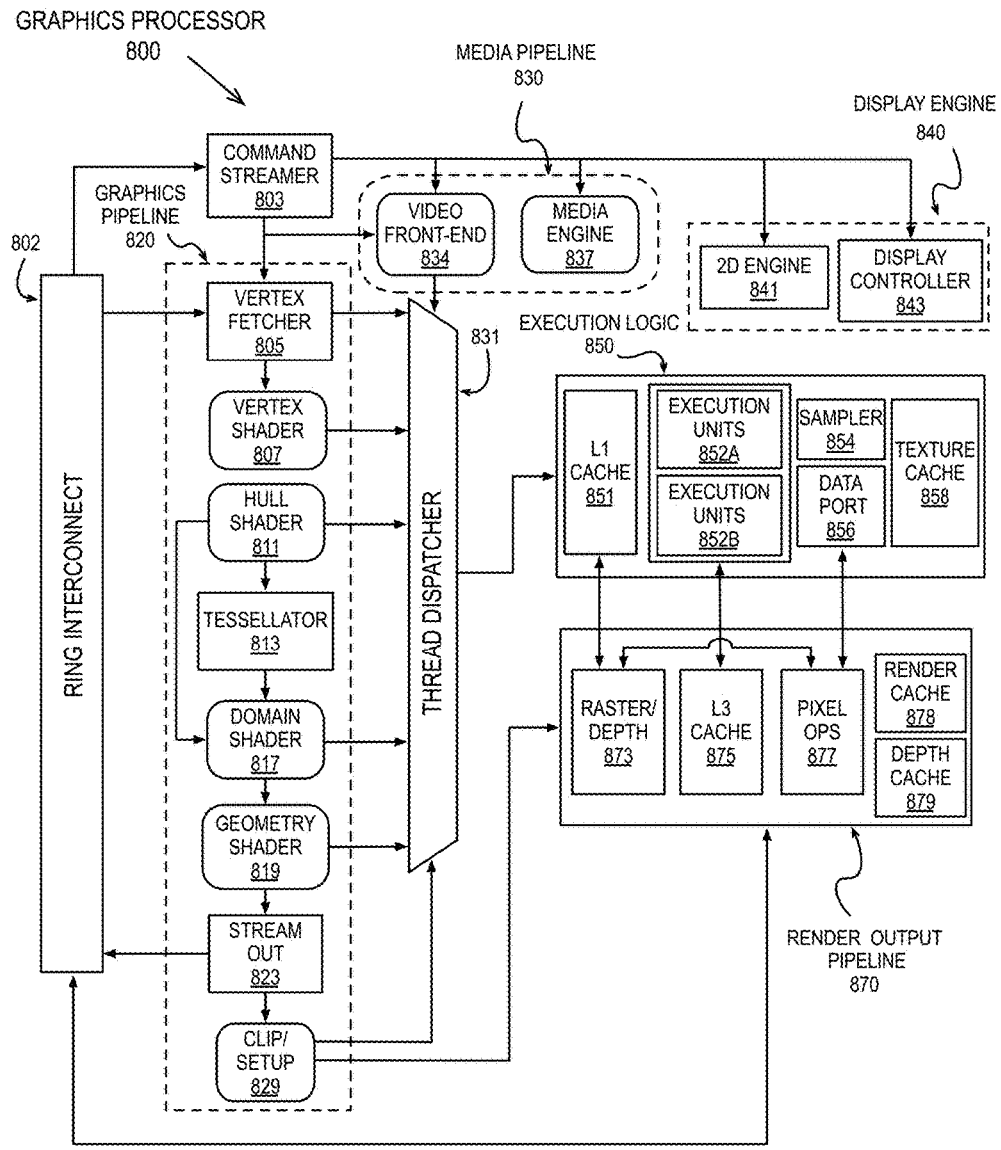

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
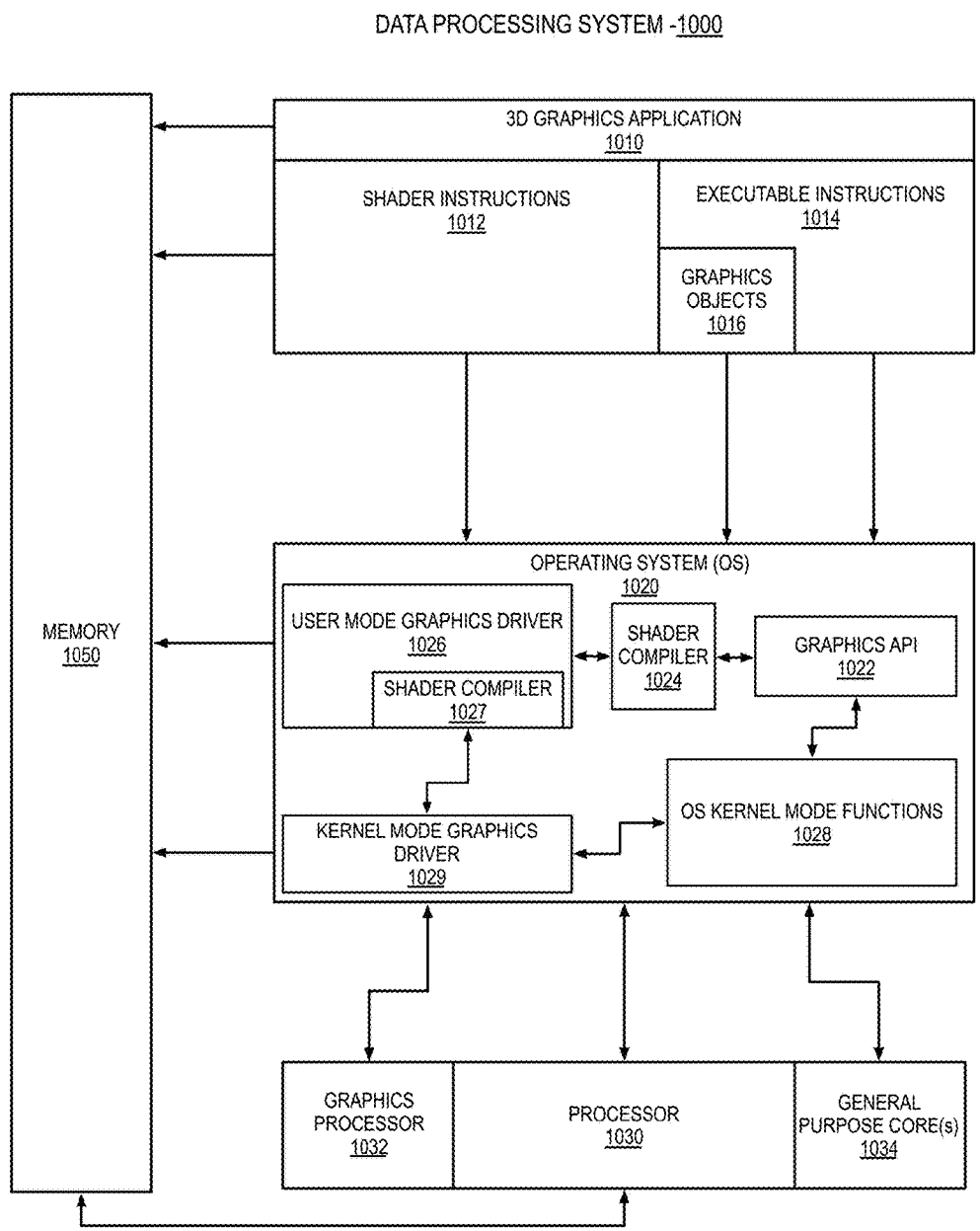

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
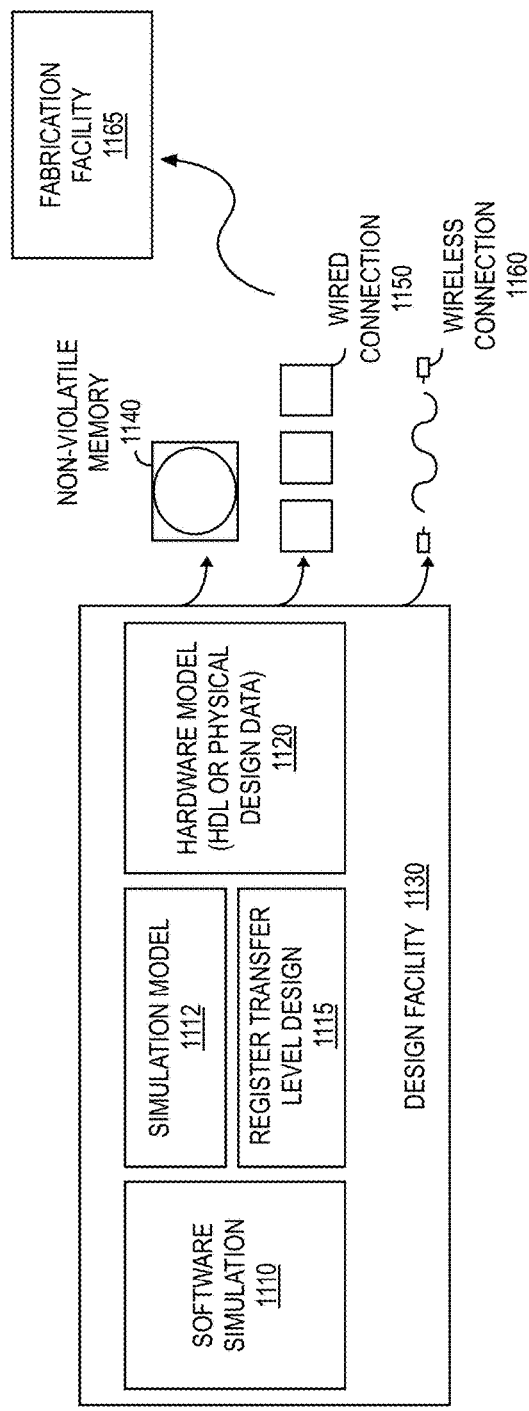
FIG. 11 illustrates a diagram of IP core development according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
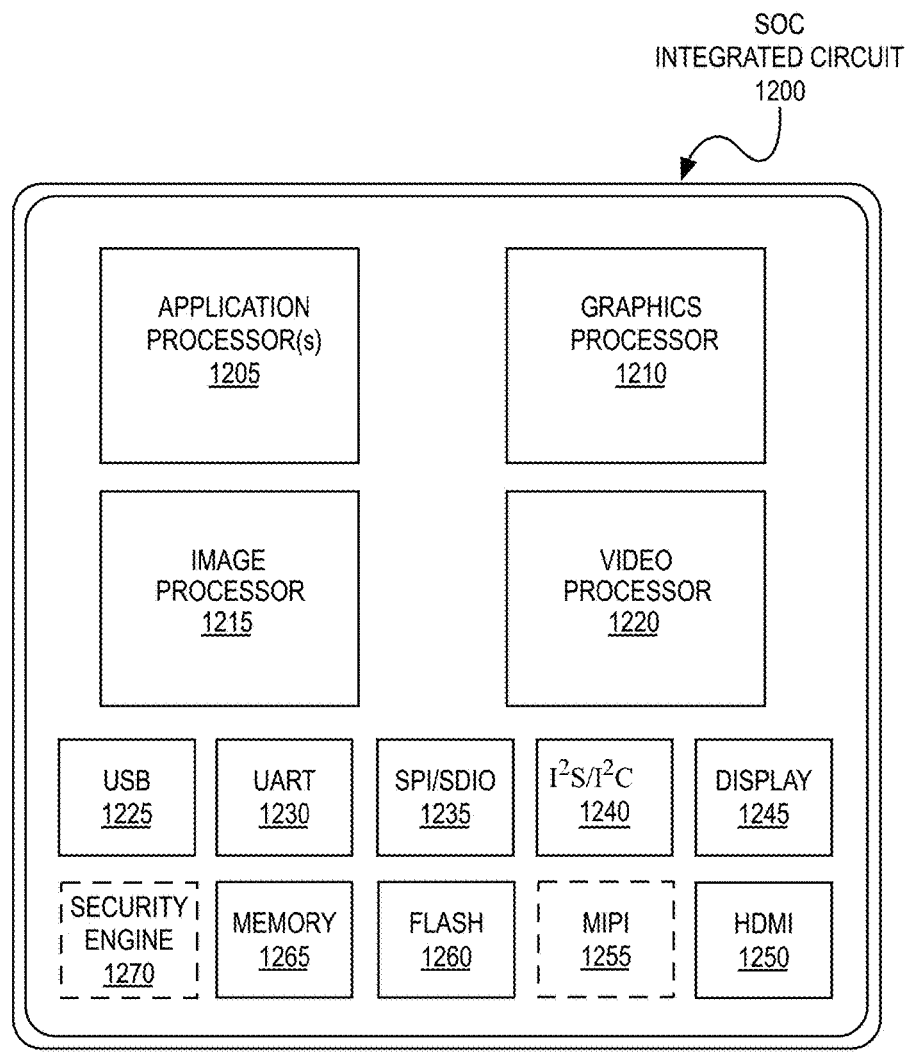
FIG. 12 illustrates components of a System on Chip (SoC or SOC) integrated circuit, according to an embodiment.
Figure 13:
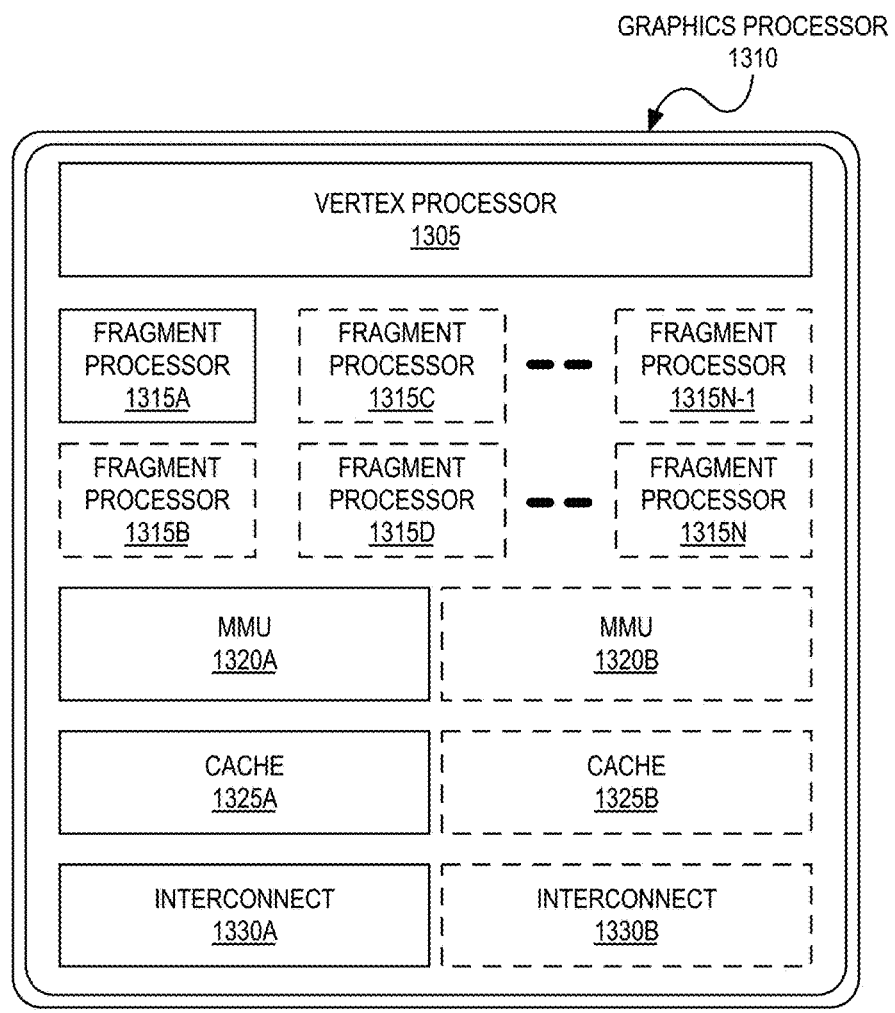
Figure 14:
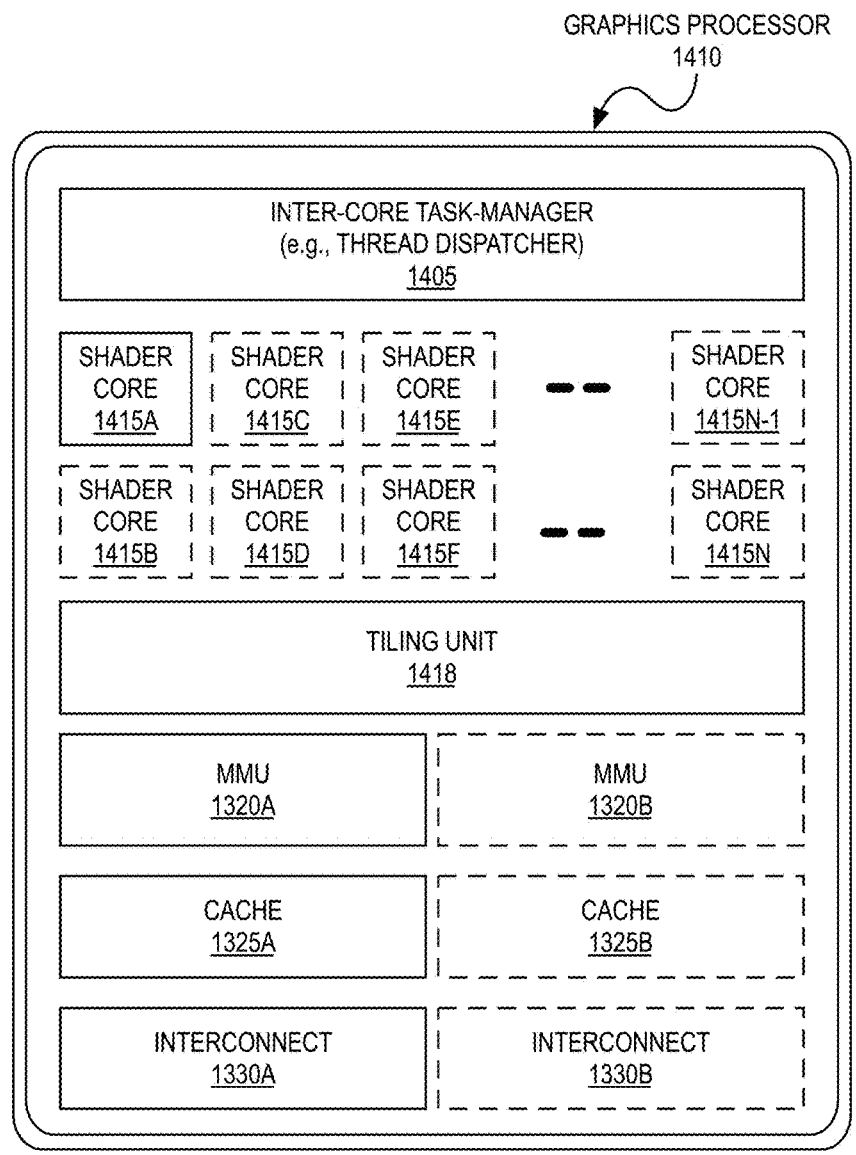

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for integrated circuit 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1325A-1325B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, caches 1325A-1325B, and circuit interconnects 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader cores 1415A-1415N and a tiling unit 1418 to accelerate tiling operations for tile-based rendering, in which rendering operations for a scene are subdivided in image space, for example to exploit local spatial coherence within a scene or to optimize use of internal caches.

As discussed above, some embodiments provide techniques for Multi-Sample Anti-Aliasing (MSAA) memory bandwidth reduction for sparse sample per pixel utilization. More particularly, at least one embodiment eliminates the extra read operation (of the entire cacheline from memory mentioned before) by using the current sample to plane mapping encoding in the control or auxiliary surface to internally generate the per-render-cacheline no-sample allocation information, which can then be used to fill up don't care data and enable all the Byte enables (i.e., where all bytes are written to the cacheline). This cacheline will eliminate the need for merging partials prior to lossless compression, e.g., increasing compressibility which is another improvement provided by at least some embodiments. Furthermore, such approaches can help improve compression ratio on MSRT surfaces.

Figure 15:
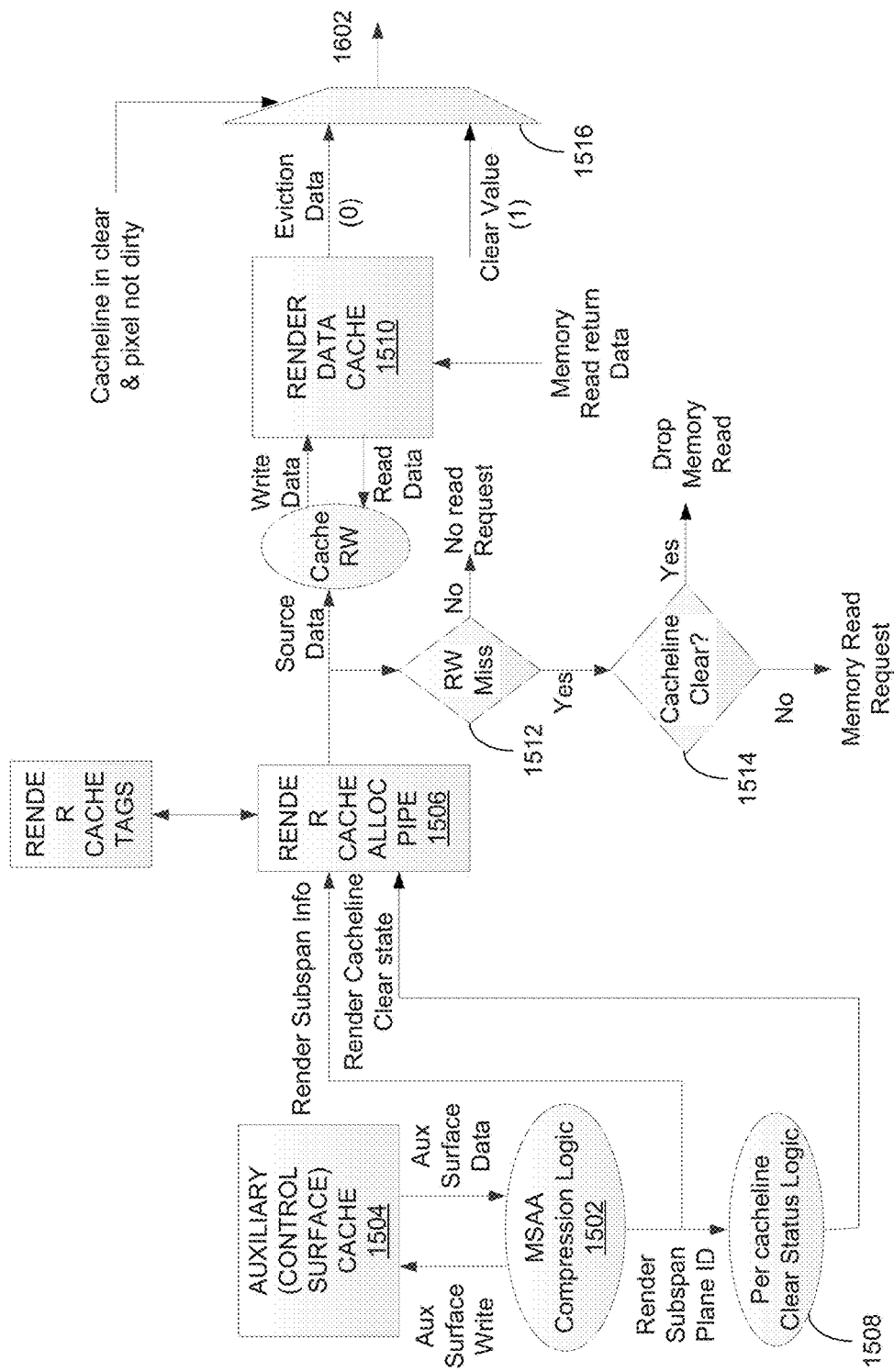
FIGS. 15 and 16 illustrate block diagrams of components to reduce MSAA memory bandwidth for sparse sample per pixel utilization, according to some embodiments.
Figure 16:
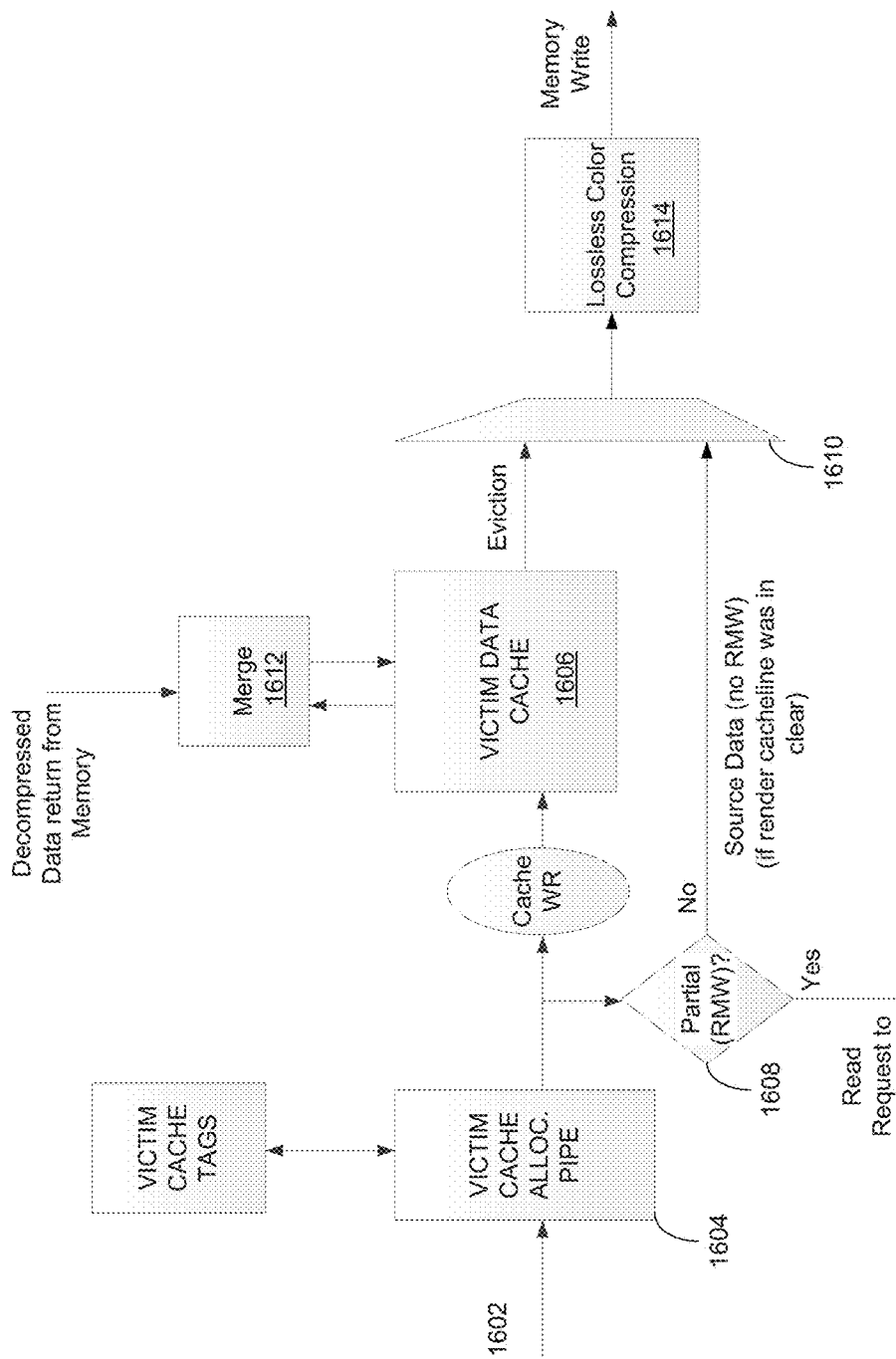

FIGS. 15 and 16 illustrate block diagrams of components to reduce MSAA memory bandwidth for sparse sample per pixel utilization, according to some embodiments.

As shown in FIG. 15, MSAA compression logic 1502 communicates auxiliary surface data with auxiliary (control surface) cache 1504. MSAA compression logic 1502 then generates a render subspan plane information/identifier and transmits to the render cache allocation pipeline 1506. Render cache allocation pipeline 1506 receives both the render subspan information and an indication/signal regarding whether the selected cacheline has a clear state (e.g., as determined by the per cacheline clear status logic 1508). In turn, render cache allocation pipeline 1506 (which may also be referred to herein interchangeably as render cache controller or logic) provides source data (including write/read data) to the render data cache 1510. The render cache allocation pipeline/logic 1506 may allocate a cacheline for a new transaction, generate read operation request(s) and/or evictions upon a cache miss. Checks the current RW status of the cacheline. Render data cache 1510 may be on-chip L1 cache used for pixel rendering operations. If there is a read/write (RW) hit at 1512, then no read request is issued. "RW" generally refers to a transaction that is capable of reading from and writing to memory. If there is an RW miss at 1512, then operation 1514 determines whether the selected cacheline has a clear state (e.g., per information received from the logic 1508). If the cacheline has a clear state, read request to memory is dropped; otherwise, the read request to memory is issued. In various embodiments, operations 1512 and/or 1514 are performed by logic or controller coupled to the render data cache 1510 (such as the pipeline 1506). The render data cache 1510 receives any memory read return data (e.g., after operation 1514). The render data cache 1510 provides eviction data to multiplexer 1516. Multiplexer 1516 also receives cacheline clear state value/indication/signal and selects between its inputs based on a selection signal (e.g., form logic 1508) that indicates whether the selected cacheline is in clear state and pixels associated with the cacheline are not dirty (or include valid data).

Referring to FIG. 16, the output of the multiplexer 1516 (signal 1602) is provided to a victim cache allocation pipeline 1604 (which may also be referred to herein interchangeably as victim cache controller or logic), which in turn provides cache WR (Write/Read) data to the victim data cache 1606. Operation 1608 (which may be performed by logic/controller coupled to the victim data cache 1606 in an embodiment) determines whether the cache WR (Write) data corresponds to a partial Read-Modify-Write (RMW) operation and if so, a read request is issued to memory; otherwise, the source data (from the victim cache allocation pipeline 1604) is provided to a multiplexer/arbitrator 1610 which selects between the eviction data from the victim data cache 1606 or the source data (e.g., per no RMW determination, or if render cacheline was determined to be in clear state). In an embodiment, if the render cacheline was in clear state, then logic 1610 passes the source data to the logic 1614; otherwise, the eviction data is passed. Hence, in MSAA, lossless compression is bypassed and the source data is written to memory (e.g., as is). As shown in FIG. 16, the victim data cache 1606 exchanges data with a merge logic 1612 which receives decompressed data returned from memory. The output of the multiplexer 1610 is provided to logic 1614 to perform lossless color compression prior to writing the compressed pixel data to memory.

Moreover, an embodiment first utilizes a special per pixel encoding of all ones (indicating lit pixels) in the MSAA auxiliary surface to suppress reading of pixels from the main surface (also referred to herein as Render Target). Pixels are stored in the render target in planar format in MSAA greater than one-fold mode. The auxiliary surface contains the sample to plane mapping of pixels in the render target. Each cacheline in the MSAA surface encodes pixels corresponding to one or more render target cachelines. If the lit pixels within a particular render target cacheline have encoding of all ones in the auxiliary surface, that cacheline is considered to be in a clear state and for a read/write allocation of the same cacheline in the render cache, the read request to memory can be suppressed; thus, saving precious memory read bandwidth. Second, for pixels which sparsely have sample profiles all distributed, one embodiment will hand over additional information to the render target cache controller, regarding all other pixels which do not have samples allocated yet. Since those pixels are not resolved yet from auxiliary surface perspective, those render target cachelines may be filled with whatever data since it is don't care data. To make it cacheline friendly for compression, those don't care pixels may be filled with the same color of one pixel in an embodiment, which are part of the corresponding sub span. This makes the cacheline friendlier for subsequent/delta compression.

By contrast in some implementations, auxiliary surface cache controller may pass on a clear indication to the render target cache controller on a per render target cacheline basis with each 2×2 pixel block allocation (although embodiments are not limited to 2×2 pixel blocks and other pixel block sizes may be used in various embodiments). During any new allocation of a 2×2 pixel block in the render target cache in MSAA, it is not possible to suppress reads as the clear status of the entire render cacheline was not available. To this end, some embodiments provide solutions to the following two problems in MSAA over some implementations: (1) indicates destination combined clear status to render cache controller on a per allocation basis of all lit pixel basis; thus, making it possible for render cache controller to drop read requests on a render cache miss, if the Multi Sample Control Surface (MCS) Value for the corresponding all lit Render Target pixels is in clear state; and/or (2) for pixels which sparsely have sample profiles all distributed, an embodiment will hand over additional information to the render target cache controller, e.g., regarding all non-lit pixel which do not have to samples allocated yet for that particular render target cacheline. Since those pixels are not resolved yet from auxiliary surface perspective, the render target cacheline can be filled with whatever data at eviction Point, since it is don't care data.

Moreover, the filling up of the don't care data per one or more embodiments has at least two benefits as follows: (a) the render target cacheline, while being written back to memory, will be written as full cachelines with all Byte enables; hence, saving memory read bandwidth; and/or (b) since some of the data can now be don't care, they can be filed with any values which makes these evictions friendlier for lossless compression (e.g., when using the same pixel color for the neighboring pixels).

In accordance with one or more embodiments, the following pseudo code is used to determine per cacheline clear status from per pixel MSAA encoding (e.g., by logic 1508 of FIG. 15):

```
Initialize Dest_pixels_CLR = 1;
If ((MSAA == 2X) | (MSAA = 4X)) {
    for ( p=0 to 7)
    Dest_pixels_CLR = Dest_pixels_CLR & (~Pixel_lit[p] |
(CURRENT_MCS[7:0] = '1))
    }
    If (MSAA == 8X) {
    for ( p=0 to 7)
    Dest_pixels_CLR = Dest_pixels_CLR & (~Pixel_lit[p] |
(CURRENT_MCS[31:0] = '1))
    }
    If (MSAA == 16X) {
    for ( p=0 to 7)
    Dest_pixels_CLR = Dest_pixels_CLR & (~Pixel_lit[p] |
(CURRENT_MCS[63:0] = '1))
    }
```

In accordance with one or more embodiments, the following pseudo code is used to determine per sub span no-sample status from per pixel MSAA encoding:

```
No Sample Information will be send over for all other un-lit Pixels
for that Render Cache line
    Initialize Dest_pixels_NoSample = 1;
    If ((MSAA == 2X) | (MSAA = 4X)) {
        If(32BPP) {
            for ( p=0 to 31)
                Dest_pixels_NoSample = Dest_pixels_NoSample &
                    (Pixel_lit[p] |
(CURRENT_MCS[7:0] = '1))
        }
        If(64BPP) {
            for ( p=0 to 15)
                Dest_pixels_NoSample = Dest_pixels_NoSample &
                    (Pixel lit[p] |
(CURRENT_MCS[7:0] = '1))
        }
        If(128BPP) {
            for ( p=0 to 7)
                Dest_pixels_NoSample = Dest_pixels_NoSample &
                    (Pixel_lit[p] |
(CURRENT_MCS[7:0] = '1))
        }
    }
    If (MSAA = 8X) {
        If(32BPP) {
            for ( p=0 to 31)
                Dest_pixels_NoSample = Dest_pixels_NoSample &
                    (Pixel_lit[p] |
(CURRENT_MCS[31:0] = '1))
        }
        If(64BPP) {
            for ( p=0 to 15)
                Dest_pixels_NoSample = Dest_pixels_NoSample &
                    (Pixel_lit[p] |
(CURRENT_MCS[31:0] = '1))
        }
        If(128BPP) {
            for ( p=0 to 7)
                Dest_pixels_NoSample = Dest_pixels_NoSample &
                    (Pixel_lit[p] |
(CURRENT_MCS[31:0] = '1))
        }
    }
    If (MSAA = 16X) {
        If(32BPP) {
            for ( p=0 to 31)
                Dest_pixels_NoSample = Dest pixels_NoSample &
                    (Pixel_lit[p] |
(CURRENT_MCS[63:0] = '1))
        }
        If(64BPP) {
            for ( p=0 to 15)
                Dest_pixels_NoSample = Dest_pixels_NoSample &
                    (Pixel_lit[p] |
(CURRENT_MCS[63:0] = '1))
        }
        If(128BPP) {
            for ( p=0 to 7)
                Dest_pixels_NoSample = Dest_pixels_NoSample &
                    (Pixel_lit[p] |
(CURRENT_MCS[63:0] = '1))
        }
    }
```

In various embodiments, one or more operations discussed with reference to FIGS. 15 and 16 may be performed by one or more components (interchangeable referred to herein as logic) discussed with reference to any of FIGS. 1-14.

The following examples pertain to further embodiments. Example 1 may optionally include an apparatus comprising: a cache to store data corresponding to one or more render operations; and Multi-Sample Anti-Aliasing (MSAA) logic to generate render subspan plane information based on data stored in a cacheline of the cache, wherein the MSAA logic is to generate the render subspan plane information based at least in part on auxiliary surface data, wherein one or more read operations to memory are to be suppressed based on a determination that the cacheline is in a clear state. Example 2 may optionally include the apparatus of example 1, wherein the auxiliary surface data is to comprise sample to plane mapping of pixels in a main surface. Example 3 may optionally include the apparatus of example 1, wherein the auxiliary surface data is to be received from an auxiliary control surface cache. Example 4 may optionally include the apparatus of example 1, comprising logic to perform lossless color compression on pixels of the cacheline. Example 5 may optionally include the apparatus of example 1, wherein the one or more read operations are to be performed in response to occurrence of a miss in the cache. Example 6 may optionally include the apparatus of example 1, wherein the clear state is to indicate that all pixels of the cacheline are lit. Example 7 may optionally include the apparatus of example 1, wherein one or more cachelines of the cache, corresponding to pixels with non-allocated samples or sparsely allocated samples, are to be indicated as don't care. Example 8 may optionally include the apparatus of example 7, wherein the one or more cachelines are to be written back to memory as full cachelines with all byte enables bits enabled. Example 9 may optionally include the apparatus of example 1, wherein one or more cachelines of the cache, corresponding to pixels with non-allocated samples or sparsely allocated samples, are to be indicated as don't care at eviction point. Example 10 may optionally include the apparatus of example 1, wherein the cache is to comprise a level 1 cache. Example 11 may optionally include the apparatus of example 1, wherein the cache is to comprise a render cache to store data corresponding to one or more render operations. Example 12 may optionally include the apparatus of example 1, further comprising a processor, coupled to the cache, wherein the processor is to comprise a Graphics Processing Unit (GPU) having one or more graphics processing cores. Example 13 may optionally include the apparatus of example 1, further comprising a processor, coupled to the cache, wherein the processor is to comprise one or more processor cores. Example 14 may optionally include the apparatus of example 1, further comprising a processor, wherein the processor is to comprise at least a portion of the cache or the MSAA logic. Example 15 may optionally include the apparatus of example 1, wherein a processor, the cache, and the MSAA logic are on a single integrated circuit die.

Example 16 may optionally include a method comprising: storing data corresponding to one or more render operations in a cache; and generating, at Multi-Sample Anti-Aliasing (MSAA) logic, render subspan plane information based on data stored in a cacheline of the cache, wherein the MSAA logic generates the render subspan plane information based at least in part on auxiliary surface data, wherein one or more read operations to memory are suppressed based on a determination that the cacheline is in a clear state. Example 17 may optionally include the method of example 16, wherein the auxiliary surface data comprises sample to plane mapping of pixels in a main surface. Example 18 may optionally include the method of example 16, further comprising receiving the auxiliary surface data from an auxiliary control surface cache. Example 19 may optionally include the method of example 16, further comprising performing lossless color compression on pixels of the cacheline. Example 20 may optionally include the method of example 16, further comprising performing the one or more read operations in response to occurrence of a miss in the cache. Example 21 may optionally include the method of example 16, wherein the clear state indicates that all pixels of the cacheline are lit. Example 22 may optionally include the method of example 16, further comprising indicating one or more cachelines of the cache, corresponding to pixels with non-allocated samples or sparsely allocated samples, as don't care. Example 23 may optionally include the method of example 16, further comprising indicating one or more cachelines of the cache, corresponding to pixels with non-allocated samples or sparsely allocated samples, as don't care at eviction point.

Example 24 includes one or more computer-readable medium comprising one or more instructions that when executed on at least one processor configure the at least one processor to perform one or more operations to: store data corresponding to one or more render operations in a cache; and generate, at Multi-Sample Anti-Aliasing (MSAA) logic, render subspan plane information based on data stored in a cacheline of the cache, wherein the MSAA logic generates the render subspan plane information based at least in part on auxiliary surface data, wherein one or more read operations to memory are suppressed based on a determination that the cacheline is in a clear state. Example 25 may optionally include the computer-readable medium of example 24, wherein the auxiliary surface data comprises sample to plane mapping of pixels in a main surface. Example 26 may optionally include the computer-readable medium of example 24, further comprising one or more instructions that when executed on the at least one processor configure the at least one processor to perform one or more operations to cause receiving the auxiliary surface data from an auxiliary control surface cache. Example 27 may optionally include the computer-readable medium of example 24, further comprising one or more instructions that when executed on the at least one processor configure the at least one processor to perform one or more operations to cause performing lossless color compression on pixels of the cacheline. Example 28 may optionally include the computer-readable medium of example 24, further comprising one or more instructions that when executed on the at least one processor configure the at least one processor to perform one or more operations to cause performing the one or more read operations in response to occurrence of a miss in the cache. Example 29 may optionally include the computer-readable medium of example 24, wherein the clear state indicates that all pixels of the cacheline are lit. Example 30 may optionally include the computer-readable medium of example 24, further comprising one or more instructions that when executed on the at least one processor configure the at least one processor to perform one or more operations to cause indicating one or more cachelines of the cache, corresponding to pixels with non-allocated samples, as don't care. Example 31 may optionally include the computer-readable medium of example 24, further comprising one or more instructions that when executed on the at least one processor configure the at least one processor to perform one or more operations to cause indicating one or more cachelines of the cache, corresponding to pixels with non-allocated samples or sparsely allocated samples, as don't care at eviction point.

Example 32 optionally includes an apparatus comprising means to perform a method as set forth in any preceding example. Example 33 includes machine-readable storage including machine-readable instructions, when executed, to implement a method or realize an apparatus as set forth in any preceding example.

In various embodiments, the operations discussed herein, e.g., with reference to FIGS. 1-16, may be implemented as hardware (e.g., logic circuitry), software, firmware, or combinations thereof, which may be provided as a computer program product, e.g., including one or more tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-16.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a cache to store data corresponding to one or more render operations; and
Multi-Sample Anti-Aliasing (MSAA) logic to generate render subspan plane information based on data stored in a cacheline of the cache, wherein the MSAA logic is to generate the render subspan plane information based at least in part on control surface data, wherein one or more read operations to memory are to be suppressed after occurrence of a miss in the cache for the one or more read operations and based on a determination that the cacheline is in a valid state.

2. The apparatus of claim 1, wherein the control surface data is to comprise data corresponding to sample to plane mapping of pixels in a main surface.

3. The apparatus of claim 1, wherein the control surface data is to be received from an auxiliary control surface cache.

4. The apparatus of claim 1, comprising logic to perform lossless color compression on pixels of the cacheline.

5. The apparatus of claim 1, wherein the one or more read operations are to be performed in response to occurrence of a miss in the cache.

6. The apparatus of claim 1, wherein the valid state is to indicate that all pixels of the cacheline are on.

7. The apparatus of claim 1, wherein one or more cachelines of the cache, corresponding to pixels with non-allocated samples or sparsely allocated samples, are to be indicated as don't care.

8. The apparatus of claim 7, wherein the one or more cachelines are to be written back to memory as full cachelines with all byte enables bits enabled.

9. The apparatus of claim 1, wherein one or more cachelines of the cache, corresponding to pixels with non-allocated samples or sparsely allocated samples, are to be indicated as don't care at eviction.

10. The apparatus of claim 1, wherein the cache is to comprise a level 1 cache.

11. The apparatus of claim 1, wherein the cache is to comprise a render cache to store data corresponding to one or more render operations.

12. The apparatus of claim 1, further comprising a processor, coupled to the cache, wherein the processor is to comprise a Graphics Processing Unit (GPU) having one or more graphics processing cores.

13. The apparatus of claim 1, further comprising a processor, coupled to the cache, wherein the processor is to comprise one or more processor cores.

14. The apparatus of claim 1, further comprising a processor, wherein the processor is to comprise at least a portion of the cache or the MSAA logic.

15. The apparatus of claim 1, wherein a processor, the cache, and the MSAA logic are on a single integrated circuit die.

16. A method comprising:
    storing data corresponding to one or more render operations in a cache; and
    generating, at Multi-Sample Anti-Aliasing (MSAA) logic, render subspan plane information based on data stored in a cacheline of the cache, wherein the MSAA logic generates the render subspan plane information based at least in part on control surface data, wherein one or more read operations to memory are suppressed after occurrence of a miss in the cache for the one or more read operations and based on a determination that the cacheline is in a valid state.

17. The method of claim 16, wherein the control surface data comprises data corresponding to sample to plane mapping of pixels in a main surface.

18. The method of claim 16, further comprising receiving the control surface data from an auxiliary control surface cache.

19. The method of claim 16, further comprising performing lossless color compression on pixels of the cacheline.

20. The method of claim 16, further comprising performing the one or more read operations in response to occurrence of a miss in the cache.

21. The method of claim 16, wherein the valid state indicates that all pixels of the cacheline are on.

22. The method of claim 16, further comprising indicating one or more cachelines of the cache, corresponding to pixels with non-allocated samples or sparsely allocated samples, as don't care.

23. One or more non-transitory computer-readable medium comprising one or more instructions that when executed on at least one processor configure the at least one processor to perform one or more operations to:
    store data corresponding to one or more render operations in a cache; and
    generate, at Multi-Sample Anti-Aliasing (MSAA) logic, render subspan plane information based on data stored in a cacheline of the cache, wherein the MSAA logic generates the render subspan plane information based at least in part on control surface data, wherein one or more read operations to memory are suppressed after occurrence of a miss in the cache for the one or more read operations and based on a determination that the cacheline is in a valid state.

24. The one or more non-transitory computer-readable medium of claim 23, wherein the control surface data comprises data corresponding to sample to plane mapping of pixels in a main surface.

25. The one or more non-transitory computer-readable medium of claim 23, further comprising one or more instructions that when executed on the at least one processor configure the at least one processor to perform one or more operations to cause receiving the control surface data from an auxiliary control surface cache.

* * * * *